Jan. 20, 1925.  1,523,818
L. P. C. LOTTE
WHEEL FOR RAILROAD VEHICLES
Filed May 20, 1924  2 Sheets-Sheet 2
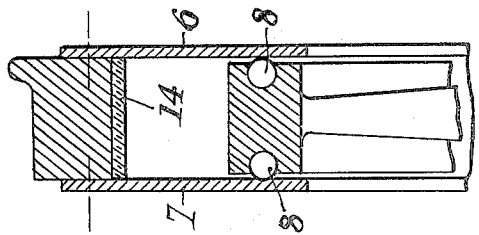
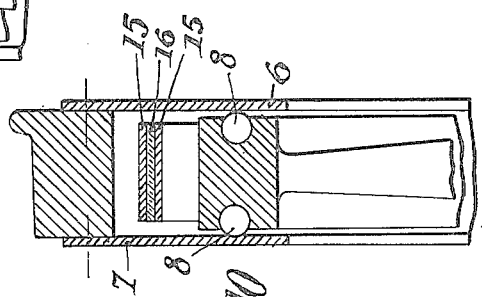
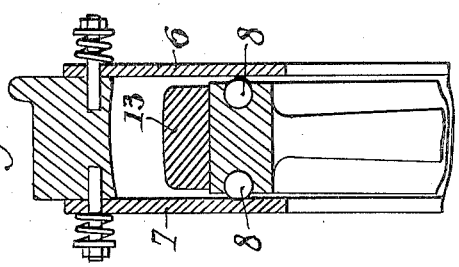
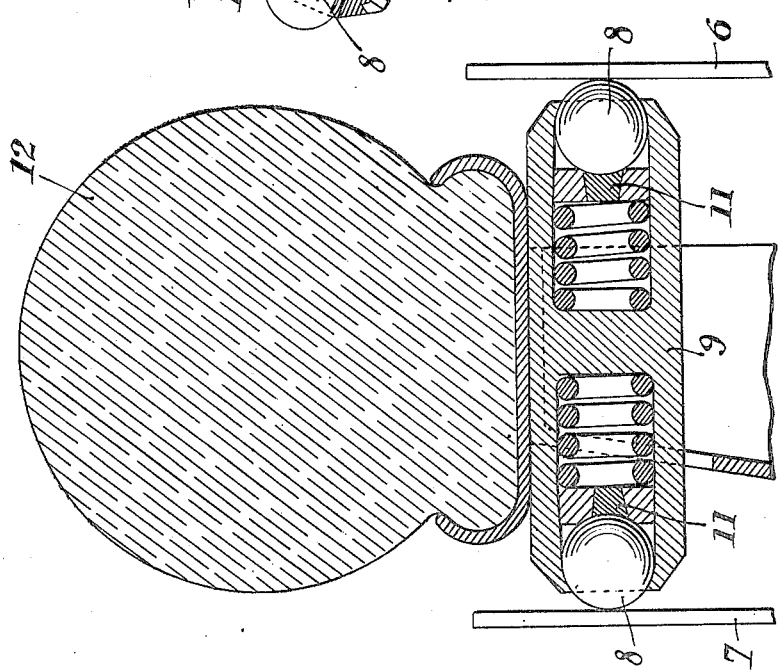
Inventor
L. P. C. Lotte
by Tenpress, Parry, Card & Tenpress
Attys.

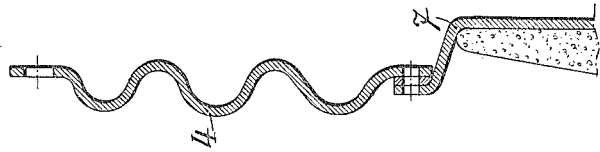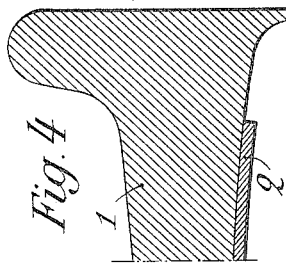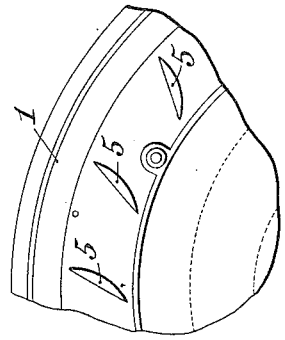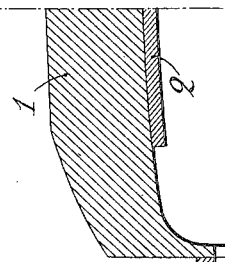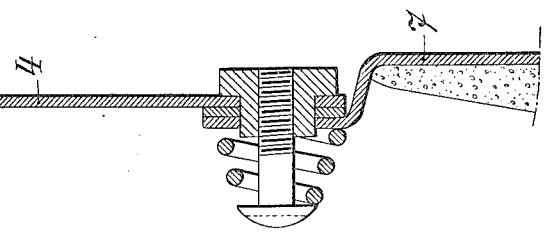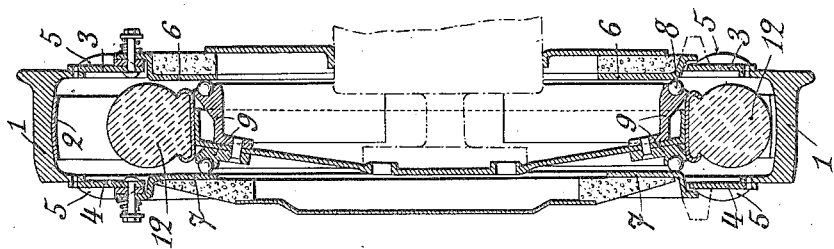

Patented Jan. 20, 1925.

1,523,818

UNITED STATES PATENT OFFICE.

LUCIEN PAUL CÉLESTIN LOTTE, OF PARIS, FRANCE.

WHEEL FOR RAILROAD VEHICLES.

Application filed May 20, 1924. Serial No. 714,713.

*To all whom it may concern:*

Be it known that I, LUCIEN PAUL CÉLESTIN LOTTE, a citizen of the Republic of France, and residing at Paris, Seine Department, No. 57 Boulevard Pereire, in the Republic of France, industrial, have invented certain new and useful Improvements in Wheels for Railroad Vehicles, of which the following is a specification.

The present invention has for its object to permit vehicles usually traveling upon rails to employ elastic tires, and to enable them to travel optionally upon ordinary roads, without the use of rails or special grooved ways.

The appended drawing shows by way of example various constructional forms of wheel with shock-absorbing means according to the invention, as well as modifications of certain elements.

Fig. 1 is a vertical section of the device, and Fig. 2 a partial elevation.

Figs. 3 and 4 are partial vertical sections on a larger scale showing the means for elastic connection of side-plates.

Fig. 5 shows a modified construction of the cheeks.

Figs. 6 and 7 show two methods of guiding the wheel according to the modifications.

Figs. 8, 9 and 10 are partial radial sections of other constructional forms of the shock-absorbing device.

The said arrangement consists essentially of a substantial metallic roller path 1, Fig. 1, in the shape of a ring having a suitable outline on its inner face, and whose internal diameter is larger than that of the vehicle wheel comprising its tire 12, whereby the said elastic tire (pneumatic or other type) can roll thereupon and even assume certain transverse displacements. A band 2 of a suitable substance (e. g. leather) can be used as a facing for the inner surface of the said roller path. At the exterior, the said roller path has the profile of the known railroad wheel tires. The said tire has at the sides the cheeks 3, 4 which may be provided (or not) with wings 5 which are suitably disposed in contrary directions upon each face so that a strong air blast will traverse the apparatus irrespectively of the direction of travel of the vehicle.

The system is guided by reason of contact between the balls and the annular side-plates 6 and 7 which latter have parallel surfaces and should be as rigid as possible, said plates being optionally connected with the roller path 1 by cheeks and in an elastic manner. The side-plates are made rigid by the arrangement of their inwardly extending edge which forms a circular flange, as represented.

Figs. 3, 4, 5 and 6 relate to various devices available for connecting the plates 6 and 7 with the roller path 1 in an elastic manner. As observed, certain of these devices are based upon the elasticity of the cheeks 3 and 4 themselves, and these may be radially slotted to form tongues acting as springs, Figs. 3 and 4; they may be corrugated after the manner of an aneroid barometer capsule, Fig. 5, or may have like forms adapted to increase the natural elasticity.

The side-plates 6 and 7 may be optionally faced at the exterior with flat cork members or the like for preventing noise. A suitable member which is readily removable serves to entirely close the opening at the centre of the outer side-plate, while providing for the free motion of the hub. It is essential that the said member should be distinct from the plate and readily removable, in order that the inspection of the axle box of the wheel shall be convenient and will thus not be neglected.

In contact with the plates 6, 7 are suitable balls which are held individually by a member 9 having a recess for the ball; said members are secured to the vehicle wheel and are preferably of gun-metal. In some cases the said recess alone is of gun-metal, and is screw threaded at the exterior in order to be more readily removable. The recesses have an oblique direction and open towards the periphery of the wheel, so that the centrifugal force will drive the said balls outwardly and will tend to expel all dust which may be introduced into the recess. The balls 8 may be preferably lubricated in their recesses 10 by piercing holes at the back of the recesses in which one disposes discs of compressed graphite 11, and due to the wear the graphite will fit closely upon the balls. The said balls may be held in their recesses by the upsetting of their edges.

The said arrangements are advantageous because they facilitate the travel of the vehicle when proceeding upon curves, and diminish the violence of the strains which would necessarily take place between the wheel and the protector such as is above described, were no elastic connecting means provided between the same.

A modification of said elastic guiding means is shown in Fig. 6, but this arrangement is inconvenient from the fact that it is more difficult to inspect and replace the springs forming the elastic element.

The preceding dispositions especially relate to light motor-propelled vehicles traveling upon tracks, and like vehicles; for heavy railroad vehicles, it is preferable to provide the vehicle wheel with a solid tire 13, Fig. 8. In default of the tire, I may provide a facing 14 on the inner surface of the roller path, which is of plastic material of some thickness, such as leather or rubber, Fig. 9. The best arrangement is had by rendering the said band independent of the wheel and also of the roller path, so that both of the latter will now be entirely metallic; the band will then be made up of various strips of leather 15 or the like, with interposed rubber strips 16, Fig. 10. The said arrangements will be advantageous upon light or heavy railroad rolling stock for the damping of short-wave vibrations which in the known devices are entirely transmitted from the rail to the vehicle body by the metal springs.

When the rolling stock thus equipped is to be used upon ordinary roads, it will suffice to replace the all-metal roller path 1 by a like element which is provided at the outer periphery with a solid tire of the known motor car type.

Claims:—

1. A shock absorbing device for vehicle wheels comprising two circular side-plates, a metal ring disposed between the said side-plates, elastic connecting means between the external edges of the said side-plates and the lateral faces of said metal ring, the outer periphery of said ring being adapted for travel upon rails while the inner periphery is adapted for use as a roller path for a vehicle wheel of smaller diameter.

2. The combination of a vehicle wheel with a rolling device comprising two circular side-plates, a metal ring disposed between the said side-plates, the outer periphery of said ring having the known configuration of railroad wheels while the inner periphery can be used as a roller path for the said vehicle wheel, elastic connecting means between the said side-plates and the lateral faces of said metal ring, and balls disposed upon the said wheel and adapted to roll upon the inner faces of the side-plates.

3. The combination of a vehicle wheel with a rolling device comprising two circular side plates, a metal ring disposed between the side-plates, the outer periphery of said ring having the known configuration of railroad wheels while the inner periphery can be used as a roller path for the said vehicle wheel, elastic connecting means between the said side-plates and the lateral faces of said metal ring, and balls disposed upon the wheel and adapted to roll upon the inner faces of the side-plates, recesses formed in the said wheel wherein the said balls are loosely revoluble, and graphite discs disposed in the said recesses for the lubrication of the said balls.

4. A shock absorbing device for vehicle wheels comprising two circular side-plates, a metal ring disposed between the said side-plates, elastic connecting means between the external edges of the said side-plates and the lateral faces of said metal ring, and an annular shock absorbing element interposed between the periphery of the vehicle wheel and the inner surface of the metal ring serving as the roller path.

5. The combination of a vehicle wheel with a rolling device comprising two circular side-plates, a metal ring disposed between the said side-plates, the outer periphery of said ring having the known configuration of railroad wheels while the inner periphery can be used as a roller path for the said vehicle wheel, elastic connecting means between the said side-plates and the lateral faces of said metal ring, said ring having cheeks possessing a certain elasticity, and springs interposed between the said cheeks and side-plates in order to provide for the lateral motion of the ring with respect to the said side-plates.

6. The combination of a vehicle wheel with a rolling device comprising two circular side-plates, a metal ring disposed between the said side-plates, the outer periphery of said ring having the known configuration of railroad wheels while the inner periphery can be used as a roller path for the said vehicle wheel, elastic connecting means between the said side-plates and the lateral faces of said metal ring, said ring having cheeks possessing a certain elasticity, and springs interposed between the said cheeks and side-plates in order to provide for the lateral motion of the ring with respect to the said side-plates, said cheeks having apertures therein for the admission of air and inclined projections or wings extending outwardly of the said apertures whereby the air is caused to enter the apertures during the rotation of the shock-absorbing device.

In testimony that I claim the foregoing as my invention, I have signed my name.

LUCIEN PAUL CELESTIN LOTTE.